United States Patent
Park et al.

(10) Patent No.: US 9,049,619 B2
(45) Date of Patent: Jun. 2, 2015

(54) APPARATUS AND METHOD OF REPORTING POWER HEADROOM IN WIRELESS COMMUNICATION SYSTEM

(75) Inventors: Sung Jun Park, Anyang-si (KR); Sung Duck Chun, Anyang-si (KR); Sung Hoon Jung, Anyang-si (KR); Seung June Yi, Anyang-si (KR); Young Dae Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 138 days.

(21) Appl. No.: 13/806,041

(22) PCT Filed: Aug. 11, 2011

(86) PCT No.: PCT/KR2011/005891
§ 371 (c)(1),
(2), (4) Date: Dec. 20, 2012

(87) PCT Pub. No.: WO2012/021002
PCT Pub. Date: Feb. 16, 2012

(65) Prior Publication Data
US 2013/0100916 A1     Apr. 25, 2013

Related U.S. Application Data

(60) Provisional application No. 61/373,256, filed on Aug. 12, 2010.

(51) Int. Cl.
| G08C 17/00 | (2006.01) |
| H04W 24/10 | (2009.01) |
| H04W 52/02 | (2009.01) |
| H04W 52/36 | (2009.01) |
| H04W 72/12 | (2009.01) |

(52) U.S. Cl.
CPC .......... *H04W 24/10* (2013.01); *H04W 52/0203* (2013.01); *H04W 72/1268* (2013.01); *H04W 52/365* (2013.01); *Y02B 60/50* (2013.01)

(58) Field of Classification Search
USPC .......................... 370/249, 252, 311, 329, 465
See application file for complete search history.

(56) References Cited

U.S. PATENT DOCUMENTS

2010/0273515 A1* 10/2010 Fabien et al. ................. 455/509
2011/0274092 A1* 11/2011 Liu et al. ....................... 370/335
(Continued)

FOREIGN PATENT DOCUMENTS

| CA | 2 724 595 A1 | 12/2009 |
| KR | 10-2009-0131653 A | 12/2009 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 9)," 3GPP TS 36.321 V9.3.0, Jun. 2010.
(Continued)

*Primary Examiner* — Peter Cheng
(74) *Attorney, Agent, or Firm* — Birch, Stewart, Kolasch & Birch, LLP

(57) ABSTRACT

A method and apparatus of reporting a power headroom in a wireless communication system are provided. A user equipment receives an uplink resource allocation for a first serving cell and determines whether a power headroom report is triggered. If the power headroom report is triggered, the user equipment determines a first power headroom for the first serving cell and a second power headroom for a second serving cell based on the uplink resource allocation.

10 Claims, 5 Drawing Sheets

(56) References Cited

U.S. PATENT DOCUMENTS

2012/0243491 A1* 9/2012 Wu .............................. 370/329
2013/0153298 A1* 6/2013 Pietraski et al. ................ 175/45

OTHER PUBLICATIONS

HTC, "Power Headroom Reporting," 3GPP TSG-RAN WG1#61, R1-102732, Montreal, Canada, May 10-14, 2010.

MediaTek, "Per UE PHR for carrier aggregation," 3GPP TSG-RAN WG1 Meeting #61bis, R1-103743, Dresden, Germany, Jun. 28-Jul. 2, 2010.

3GPP, "3rd Generation Partnership Project; Technical Specification Group Radio Access Network; Evolved Universal Terrestrial Radio Access (E-UTRA); Medium Access Control (MAC) protocol specification (Release 9)," 3GPP TS 36.321, V9.2.0, Mar. 2010, pp. 1-48.

ASUSTeK, "Power headroom report in LTE-A," Agenda Item 6.2.5.2, 3GPP TSG RAN WG1 Meeting #61, R1-103189, Montreal, Canada, May 10-14, 2010, 3 pages.

* cited by examiner

APPARATUS AND METHOD OF REPORTING POWER HEADROOM IN WIRELESS COMMUNICATION SYSTEM

CROSS REFERENCE TO RELATED APPLICATIONS

This application is the National Phase of PCT/KR2011/005891 filed on Aug. 11, 2011, which claims priority under 35 U.S.C. 119(e) to U.S. Provisional Application No. 61/373,256 filed on Aug. 12, 2010, all of which are hereby expressly incorporated by reference into the present application.

TECHNICAL FIELD

The present invention relates to wireless communications, and more particularly, to a method and apparatus of reporting a power headroom in a wireless communication system.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

To mitigate interference due to uplink transmission, a transmit power of a user equipment needs to be adjusted. If the transmit power of the user equipment is too low, a base station barely receive uplink data. If the transmit power of the user equipment is too high, the uplink transmission may give too much interference to other user equipments' transmission.

A power headroom reporting procedure is used to provide the serving base station with information about the difference between the nominal maximum transmit power and the estimated power for uplink transmission.

Recently, with the introduction of multiple carriers, one user equipment can receive a service from a plurality of serving cells. With the introduction of the plurality of serving cells, there is a need for a method in which a user equipment calculates power headrooms for the plurality of serving cells and performs power headroom reporting.

DISCLOSURE OF INVENTION

Technical Problem

The present invention provides a method and apparatus for reporting a power headroom in a wireless communication system.

Solution to Problem

In an aspect, a method of reporting a power headroom in a wireless communication system is provided. The method includes receiving, by a user equipment, an uplink resource allocation for a first serving cell, determining, by the user equipment, whether a power headroom report is triggered, if the power headroom report is triggered, determining a first power headroom for the first serving cell and a second power headroom for a second serving cell based on the uplink resource allocation, and transmitting, by the user equipment, the first power headroom and the second power headroom.

The first power headroom and the second power headroom may be transmitted by using uplink resources indicated by the uplink resource allocation.

The method may further include determining, by the user equipment, a maximum power reduction (MPR) based on the uplink resource allocation, wherein the first power headroom and the second power headroom are determined based on the MPR.

In another aspect, an apparatus of reporting a power headroom in a wireless communication system is provided. The apparatus includes a radio frequency unit for transmitting and receiving radio signals, and a processor operatively coupled with the radio frequency unit and configured for receiving an uplink resource allocation for a first serving cell, determining whether a power headroom report is triggered, if the power headroom report is triggered, determining a first power headroom for the first serving cell and a second power headroom for a second serving cell based on the uplink resource allocation, and transmitting the first power headroom and the second power headroom.

Advantageous Effects of Invention

A power headroom for a serving cell for which an uplink (UL) grant is not provided can be reported. A base station can manage power reduction of a user equipment even for the serving cell for which the UL grant is not provided.

MODE FOR THE INVENTION

Figure 1:
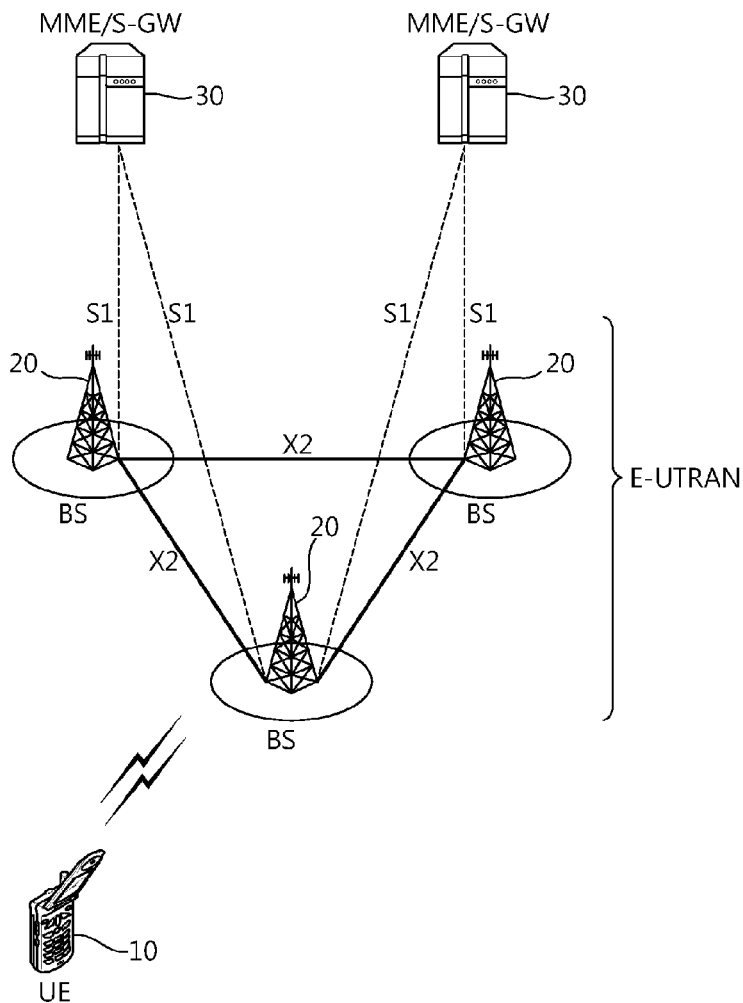
FIG. 1 shows a wireless communication system to which the present invention is applied.

FIG. 1 shows a wireless communication system to which the present invention is applied. A wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
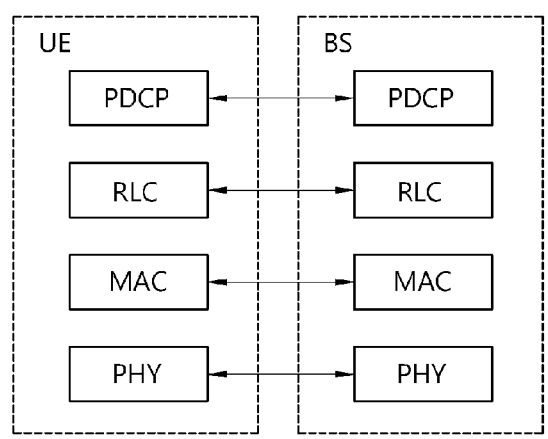
FIG. 2 is a diagram showing a radio protocol architecture for a user plane.
Figure 3:
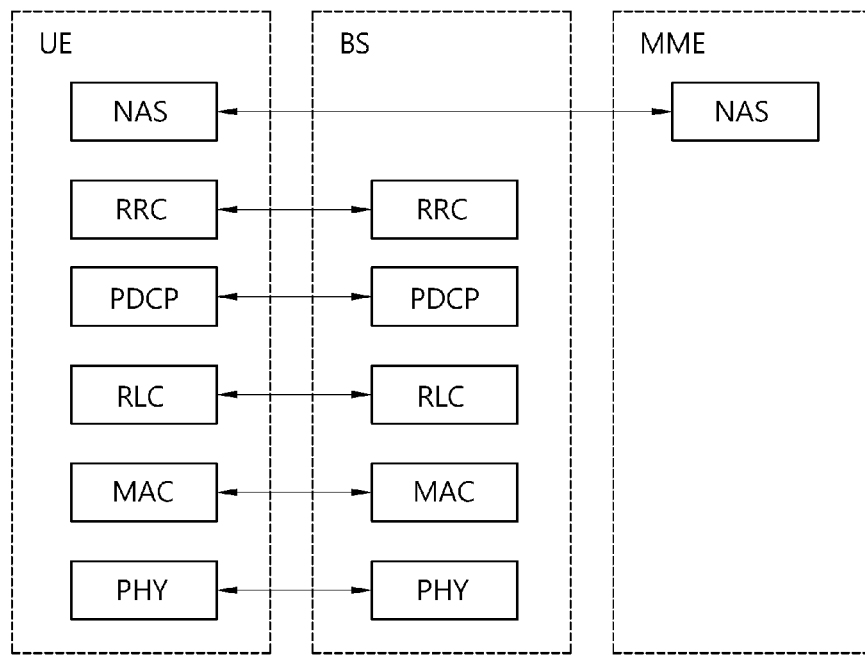
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

As disclosed in 3GPP TS 36.211 V8.7.0, the 3GPP LTE classifies physical channels into a data channel, i.e., a physical downlink shared channel (PDSCH) and a physical uplink shared channel (PUSCH), and a control channel, i.e., a physical downlink control channel (PDCCH), Physical Control Format Indicator Channel (PCFICH), Physical Hybrid-ARQ Indicator Channel (PHICH) and a physical uplink control channel (PUCCH).

Now, a multiple carrier system will be disclosed.

A 3GPP LTE system supports a case where a downlink bandwidth and an uplink bandwidth are set differently under the premise that one component carrier (CC) is used. The CC is defined with a center frequency and a bandwidth. This implies that the 3GPP LTE is supported only when the downlink bandwidth and the uplink bandwidth are identical or different in a situation where one CC is defined for each of a downlink and an uplink. For example, the 3GPP LTE system supports up to 20 MHz and the uplink bandwidth and the downlink bandwidth may be different from each other, but supports only one CC in the uplink and the downlink.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems.

Figure 4:
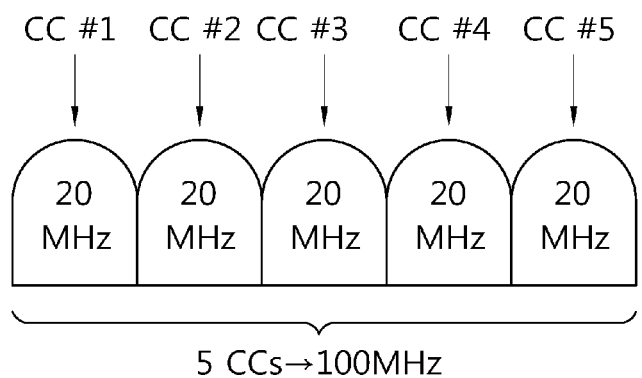
FIG. 4 shows an example of multiple carriers.

FIG. 4 shows an example of multiple carriers. There are five CCs, i.e., CC #1, CC #2, CC #3, CC #4, and CC #5, each of which has a bandwidth of 20 MHz. Therefore, if the five CCs are allocated in a granularity of a CC unit having the bandwidth of 20 MHz, a bandwidth of up to 100 MHz can be supported.

The bandwidth of the CC or the number of the CCs are exemplary purposes only. Each CC may have a different bandwidth. The number of downlink CCs and the number of uplink CCs may be identical to or different from each other.

Figure 5:
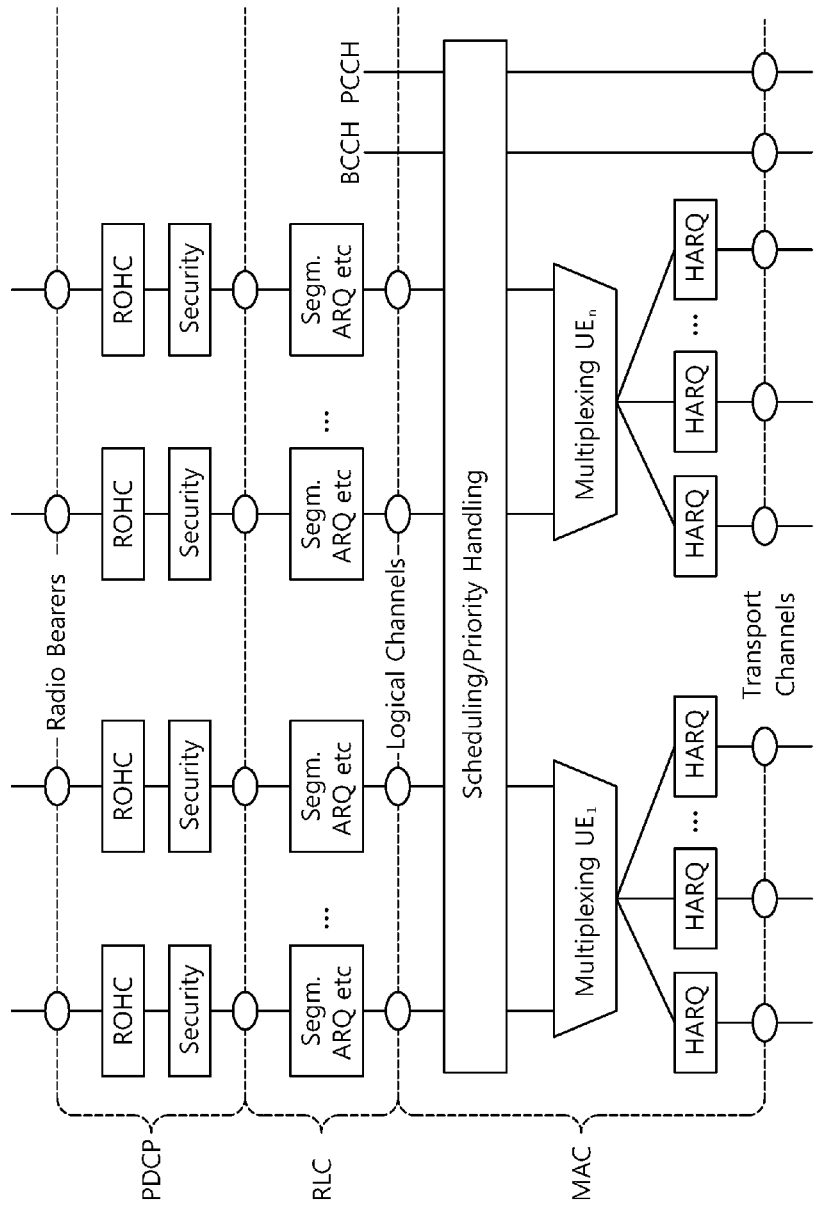
FIG. 5 shows a second-layer structure of a BS for multiple carriers.
Figure 6:
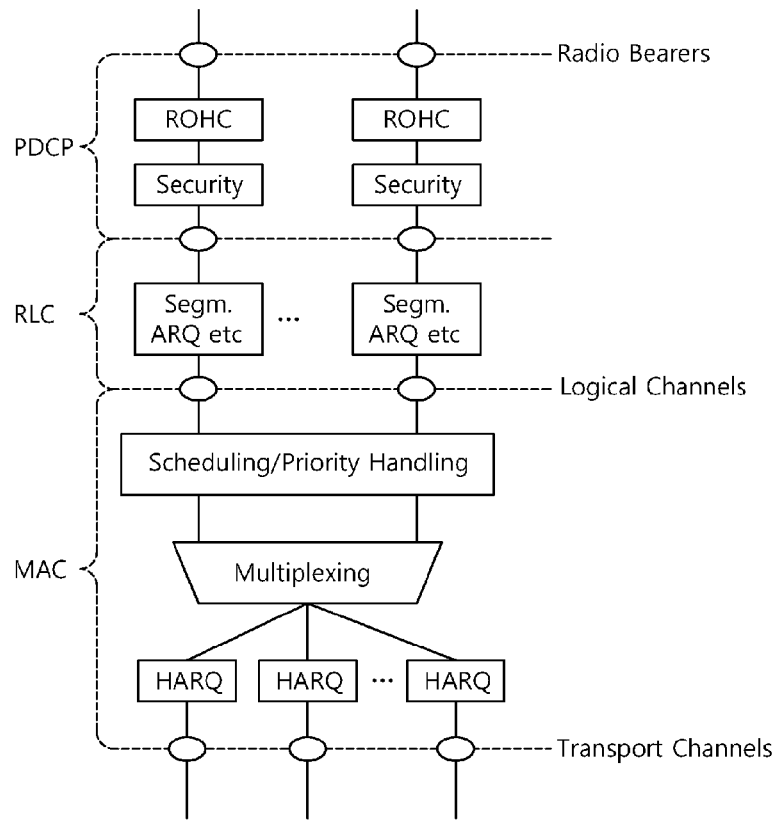
FIG. 6 shows a second-layer structure of a UE for multiple carriers.

FIG. 5 shows a second-layer structure of a BS for multiple carriers. FIG. 6 shows a second-layer structure of a UE for multiple carriers.

A MAC layer can manage one or more CCs. One MAC layer includes one or more HARQ entities. One HARQ entity performs HARQ on one CC. Each HARQ entity independently processes a transport block on a transport channel. Therefore, a plurality of HARQ entities can transmit or receive a plurality of transport blocks through a plurality of CCs.

One CC (or a CC pair of a downlink CC and an uplink CC) may correspond to one cell. When a synchronous signal and system information are provided by using each downlink CC, it can be said that each downlink CC corresponds to one serving cell. When the UE receives a service by using a plurality of downlink CCs, it can be said that the UE receives the service from a plurality of serving cells.

The BS can provide the plurality of serving cells to the UE by using the plurality of downlink CCs. Accordingly, the UE and the BS can communicate with each other by using the plurality of serving cells.

A cell may be classified into a primary cell and a secondary cell. The primary cell is always activated and is operated in a primary frequency. In the primary cell, the UE either performs the initial connection establishment procedure or initiates the connection re-establishment procedure. The secondary cell may be activated or inactivated and is operated in a secondary frequency. The secondary cell may be configured once an RRC connection is established and may be used to provide additional radio resources. The primary cell may be configured with a pair of DL CC and UL CC. The secondary cell may be configured with a pair of DL CC and UL CC or a DL CC only. Serving cells include one or more primary cells and zero or more secondary cells.

Next, a power headroom reporting will be disclosed.

To mitigate interference due to UL transmission, a transmit power of a UE needs to be adjusted. If the transmit power of the UE is too low, the BS barely receive UL data. If the transmit power of the UE is too high, the UL transmission may give too much interference to other UE's transmission.

A power headroom reporting procedure is used to provide the serving BS with information about the difference between the nominal UE maximum transmit power and the estimated power for UL-SCH transmission. RRC controls the power headroom reporting by configuring the two timers, a periodic timer and prohibit timer, and by signalling a pathloss threshold which sets the change in measured downlink pathloss to trigger the power headroom reporting.

According to the section 5.1.1 of 3GPP TS 36.213 V8.8.0 (2009-09) "Evolved Universal Terrestrial Radio Access (E-UTRA); Physical layer procedures (Release 8)", According to the section 5.1.1 of 3GPP TS 36.213 V8.8.0 (2009-09) "Evolved Universal Terrestrial Radio Access (E-UTRA); Physical layer procedures (Release 8)", a power headroom valid for subframe i is defined by:

MathFigure 1

$$PH(i) = P_{CMAX} - \{10 \log_{10}(M_{PUSCH}(i)) + P_{O\_PUSCH}(j) + \alpha(j)PL + \Delta_{TF}(i) + f(i)\} \quad \text{[Math.1]}$$

where, $P_{CMAX}$ is the configured UE transmitted power, $M_{PUSCH}(i)$ is the bandwidth of the PUSCH resource assignment expressed in number of resource blocks valid for subframe i, PL is a downlink pathloss estimate calculated in the UE, and $P_{O\_PUSCH}(j)$,

α

(j),

Δ

$_{TF}(j)$ and f(i) are parameters obtained from higher layer signaling.

A power headroom report (PHR) may be triggered if any of the following events occur:

a prohibit timer expires or has expired and the path loss has changed more than the pathloss threshold since the transmission of a PHR when UE has UL resources for new transmission;

a periodic timer expires;

upon configuration or reconfiguration of the power headroom reporting functionality by upper layers, which is not used to disable the function.

If the UE has UL resources allocated for new transmission for this TTI:

if it is the first UL resource allocated for a new transmission since the last MAC reset, start the periodic timer;

if the power headroom reporting procedure determines that at least one PHR has been triggered since the last transmission of a PHR or this is the first time that a PHR is triggered, and;

if the allocated UL resources can accommodate a PHR MAC control element plus its subheader as a result of logical channel prioritization:

obtain the value of the power headroom from the physical layer;

instruct the Multiplexing and Assembly procedure to generate and transmit a PHR

MAC control element based on the value reported by the physical layer;

start or restart the periodic timer;

start or restart the prohibit timer;

cancel all triggered PHR(s).

The power headroom is transmitted as a MAC control element. A power headroom field in the MAC control element includes 6 bits.

Next, a maximum power reduction (MPR) will be disclosed.

A high-order modulation scheme (e.g., 16-QAM) used in 3GPP LTE and a great number of allocated resource blocks (RBs) increase a difference between average power and maximum power, which causes poor power efficiency. In addition, it becomes difficult to design a power amplifier of a UE. Therefore, in order to enable the UE to autonomously perform power reduction, the 3GPP LTE defines a maximum lower threshold of maximum output power. This value is called the MPR. That is, the UE may autonomously decrease power less than a value permitted by the MPR and thereafter may transmit a signal to a BS.

Table 1 below shows the MPR depending on the modulation scheme and the number of RBs.

TABLE 1

| Modulation | Channel bandwidth/Transmission bandwidth configuration(RB) | | | | | | MPR (dB) |
| --- | --- | --- | --- | --- | --- | --- | --- |
| | 1.4 MHz | 3.0 MHz | 5 MHz | 10 MHz | 15 MHz | 20 MHz | |
| QPSK | >5 | >4 | >8 | >12 | >16 | >18 | ≤1 |
| 16-QAM | ≤1 | ≤4 | ≤8 | ≤12 | ≤16 | ≤18 | ≤1 |
| 16-QAM | >5 | >4 | >8 | >12 | >16 | >18 | ≤2 |

For an example, the configured maximum UE transmitted power $P_{CMAX}$ can be set within the following bounds.

MathFigure 2

$$P_{CMAX,L} \leq P_{CMAX} \leq P_{CMAX,H} \quad \text{[Math.2]}$$

where $P_{CMAX,L}$ is a low bound of the configured maximum output power and $P_{CMAX,H}$ is a high bound of the configured maximum output power. $P_{CMAX,L}$ can be obtained from $P_{CMAX,H}$–MPR.

As described above, the UE can announce the power headroom to the BS by using the PHR. The power headroom is calculated by additionally considering other factors such as a pathloss after subtracting a currently used transmit power from a configured maximum UE transmitted power to which the MPR is applied. The currently used transmit power is calculated by considering the number of RBs of a UL grant and the modulation scheme.

The UE can decrease power by autonomously using the MPR. That is, this implies that the BS cannot know the MPR applied by the UE, and thus cannot correctly determine maximum output power of the UE.

The PHR is used to avoid PUSCH allocations requiring more than maximum UE transmit power. The power headroom indicated by the PHR is in general based on the measured path loss and the MPR. Specially, the MPR is UE specific and not known by the BS. And the UE applies MPR differently depending on the indicated modulation and the allocated number of RBs. Thus, from the received PHR, the BS can estimate how MPR is applied with the indicated modulation and the allocated number of RB.

In order to calculate the MPR and the power headroom, UL resource allocation is necessary. The UL grant includes the UL resource allocation.

When the UE has a plurality of serving cells, the UL grant is not always scheduled for all cells. According to equation 1, the power headroom cannot be calculated for a serving cell not having the UL grant, and thus power headroom reporting is impossible.

However, reporting of the power headroom is necessary for all available serving cells. This is because the power headroom includes a factor required for calculation of transmit power such as a pathloss.

For the serving cell not having the UL grant, the power headroom can be calculated without considering the UL grant. For example, MPR=0 in this case. However, since the MPR is not considered in the power headroom, it may be ineffective for the BS to manage power reduction of the UE.

According to the proposed invention, a UL grant allocated to a first serving cell for which a PHR is triggered is used to calculate a power headroom of a second serving cell for which the UL grant is not provided. An MPR of the first serving cell is calculated by using the UL grant allocated to the first serving cell, and this MPR is also used to calculate the power headroom of the second serving cell.

More specifically, it is assumed that maximum output power of the second serving cell in which the MPR is not considered is 23 dBm. First, the UE calculates the MPR according to RB information and a demodulation scheme indicated by the UL grant of the first serving cell. It is assumed that the MPR is 2 dB. Therefore, the UE sets a transmit power $P_{CMAX}$ of the second cell to 21 dBm. Further, the UE calculates the power headroom of the second serving cell by considering other factors such as a path loss.

The PHR may include power headrooms of all activated serving cells. For example, it is assumed that 3 cells are allocated to the UE, and the first and second cells are activated whereas the third cell is deactivated. When the UL grant is received and the PHR is triggered, the UE reports power headrooms of the first and second cells to the BS.

The UE can configure a PHR for a plurality of serving cells as one MAC control element. The MAC control element may include a power headroom of each serving cell, at least one serving cell identifier, and/or an indicator indicating that a power headroom is calculated from a UL grant of another serving cell.

A plurality of UL grants can be provided from a plurality of serving cells. Hereinafter, a cell to which the UL grant is allocated is called a granted serving cell, and a cell to which the UL grant is not allocated is called a non-granted serving cell.

For example, it is assumed that three serving cells are present. The UE receives from the BS a first UL grant for the first serving cell and a second UL grant for the second serving cell. When a PHR is triggered, the UE calculates a power headroom of the third serving cell by using the first UL grant and the second UL grant. Further, the UE transmits power headrooms of the three serving cells via the first serving cell or the second serving cell.

When a plurality of granted serving cells are present, there may be a need to consider whose granted serving cell a UL grant will be used to determine a power headroom of a non-granted serving cell or through which granted serving cell the PHR will be transmitted. The UE may randomly select the granted serving cell. Alternatively, the UE may preferentially select a primary cell. The BS may announce information regarding which granted serving cell will be selected.

Figure 7:
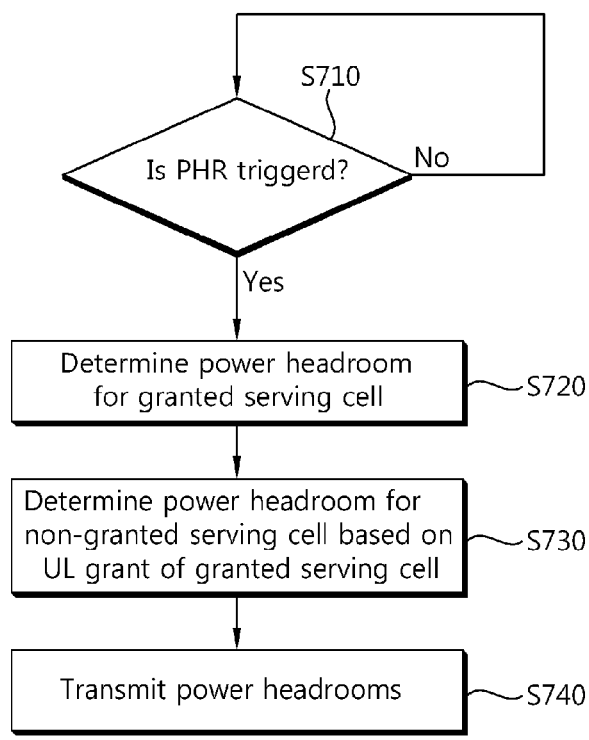
FIG. 7 is a flowchart showing a method of reporting a power headroom according to an embodiment of the present invention.

FIG. 7 is a flowchart showing a method of reporting a power headroom according to an embodiment of the present invention.

A UE confirms whether a PHR is triggered according to the aforementioned PHR trigger criteria (step S710).

When the PHR is triggered, the UE determines an MPR and a power headroom for a granted serving cell for which a UL grant is provided (step S720). To clarify the following description, it is assumed that a first serving cell is a granted serving cell for which the UL grant is provided, and a second serving cell is a non-granted serving cell for which the UL grant is not provided.

A power headroom valid for subframe i for the first serving cell s1 can be determined by:

MathFigure 3

$$PH_{s1}(i) = P_{CMAX,s1} - \{10 \log_{10}(M_{PUSCH,s1}(i)) + P_{O\_PUSCH,s1}(j) + \alpha_{s1}(j)PL_{s1} + \Delta_{TF,s1}(i) + f_{s1}\} \quad \text{[Math.3]}$$

where, $P_{CMax,s1}$ is the configured UE transmitted power obtained by applying MPR for the first serving cell s1, $M_{PUSCH,s1}(i)$ is the bandwidth of the uplink resource assignment (or the UL grant) valid for subframe i for the first serving cell s1, $PL_{s1}$ is a downlink pathloss estimate for the first serving cell s1 calculated in the UE, and $P_{O\_PUSCH,s1}(j)$, $\alpha_{s1}(j)$, $\Delta_{TF,s1}(j)$ and $f_{s1}(i)$ are parameters for the first serving cell s1 obtained from higher layer signaling. The MPR for the first serving cell may be determined by a modulation scheme and the number of RBs in the UL grant.

The UE determines an MPR and a power headroom for the non-granted serving cell (step S730). The second serving cell does not have the UL grant, and thus can determine the MPR and the power headroom on the basis of the UL grant of the first serving cell.

A power headroom valid for subframe i for the second serving cell s2 can be determined by:

MathFigure 4

$$PH_{s2}(i) = P_{CMAX,s2} - \{P_{O\_PUSCH,s2}(j) + \alpha_{s2}(j)PL_{s2} + f_{s2}(i)\} \quad \text{[Math.4]}$$

where, $P_{CMAX,s2}$ is the configured UE transmitted power obtained by applying MPR for the first serving cell s1, $PL_{s1}$ is a downlink pathloss estimate for the first serving cell s2 calculated in the UE, and $P_{O\_PUSCH,s2}(j)$, $\alpha_{s2}(j)$ and $f_{s2}(i)$ are parameters for the first serving cell s2 obtained from higher layer signaling.

Alternatively, a power headroom valid for subframe i for the second serving cell s2 can be determined by:

MathFigure 5

$$PH_{s2}(i)=P_{CMAX,s2}-\{10\log_{10}(M_{PUSCH,s1}(i))+P_{O\_PUSCH,s2}(j)+\alpha_{s2}(j)PL_{s2}+\Delta_{TF,s2}(i)+f_{s2}\}$$ [Math.5]

The UE generates a PHR from the determined power headroom, and transmits the PHR to a BS (step S740). The PHR may be transmitted as a MAC control element. Upon receiving the PHR, the BS determines from which serving cell the PHR is reported, and may estimate an MPR of the non-granted serving cell by using a UL grant of that serving cell.

The BS may announce to the UE whether the power headroom of the non-granted serving cell can be determined from the UL grant of the granted serving cell.

The BS may announce to the UE whether the power headroom of the non-granted serving cell will be included in the PHR.

Figure 8:
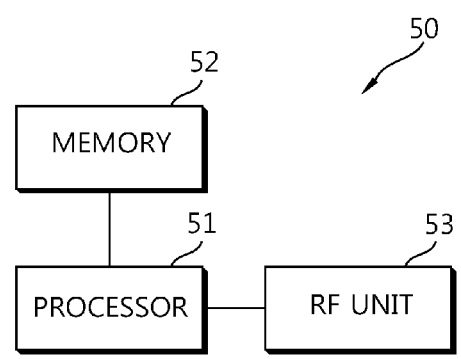
FIG. 8 is a block diagram showing an apparatus for implementing an embodiment of the present invention.

FIG. 8 is a block diagram showing an apparatus for implementing an embodiment of the present invention. The apparatus may be a part of a UE.

An apparatus 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, processes and/or methods. The processor 51 may perform operations of UE to report the PHR according to the embodiment of FIG. 7.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method of reporting a power headroom in a wireless communication system, the method comprising:
receiving, by a user equipment, an uplink grant for a first serving cell;
determining, by the user equipment, whether a power headroom report is triggered;
if the power headroom report is triggered, determining, by the user equipment based on the uplink grant, a first power headroom for the first serving cell having the uplink grant and a second power headroom for a second serving cell not having the uplink grant;
determining, by the user equipment based on a number of resource blocks in the uplink grant, a first maximum power reduction (MPR) for the first serving cell having the uplink grant;
determining, by the user equipment based on the uplink grant, a second MPR for the second serving cell not having the uplink grant; and
transmitting, by the user equipment, the determined first power headroom and the determined second power headroom by using uplink resources indicated by the uplink grant received for the first serving cell but not for the second serving cell,
wherein the first power headroom and the second power headroom are transmitted as a medium access control (MAC) control element, and
wherein the MAC control element includes an identifier of the first serving cell, and an indicator indicating that the second power headroom is determined based on the uplink grant for the first serving cell.

2. The method of claim 1, wherein the power headroom report is triggered when a periodic timer is expired.

3. The method of claim 1, wherein the first serving cell is a primary cell.

4. The method of claim 1, wherein the first MPR for the first serving cell having the uplink grant is determined based on both a modulation scheme and the number of resource blocks in the uplink grant.

5. The method of claim 1, wherein the transmission of the first and second power headroom is controlled via a radio resource control (RRC) layer using a period timer and a prohibit timer.

6. An apparatus of reporting a power headroom in a wireless communication system, the apparatus comprising:
a radio frequency unit configured to transmit and receive radio signals; and
a processor operatively coupled with the radio frequency unit and configured to:
receive an uplink grant for a first serving cell,
determine whether a power headroom report is triggered,
if the power headroom report is triggered, determine based on the uplink grant, a first power headroom for the first serving cell having the uplink grant and a second power headroom for a second serving cell not having the uplink grant,
determine, based on a number of resource blocks in the uplink grant, a first maximum power reduction (MPR) for the first serving cell having the uplink grant,
determine, based on the uplink grant, a second MPR for the second serving cell not having the uplink grant, and
transmit the determined first power headroom and the determined second power headroom by using uplink resources indicated by the uplink grant received for the first serving cell but not for the second serving cell,
wherein the first power headroom and the second power headroom are transmitted as a medium access control (MAC) control element, and
wherein the MAC control element includes an identifier of the first serving cell, and an indicator indicating that the second power headroom is determined based on the uplink grant for the first serving cell.

7. The apparatus of claim 6, wherein the power headroom report is triggered when a periodic timer is expired.

8. The apparatus of claim 6, wherein the first serving cell is a primary cell.

9. The apparatus of claim 6, wherein the first MPR for the first serving cell having the uplink grant is determined based on both a modulation scheme and the number of resource blocks in the uplink grant.

10. The apparatus of claim 6, wherein the transmission of the first and second power headroom is controlled via a radio resource control (RRC) layer using a period timer and a prohibit timer.

* * * * *